(12) United States Patent
Skovron et al.

(10) Patent No.: US 7,584,717 B2
(45) Date of Patent: Sep. 8, 2009

(54) PORTABLE TOILET

(75) Inventors: Tobi Skovron, Elwood (AU); Simone Iglicki, Elwood (AU)

(73) Assignee: Pup Pee Silutions Pty Ltd, North Caulfield, Victoria (AU)

( * ) Notice: Subject to any disclaimer, the term of this patent is extended or adjusted under 35 U.S.C. 154(b) by 189 days.

(21) Appl. No.: 11/692,812

(22) Filed: Mar. 28, 2007

(65) Prior Publication Data

US 2007/0283895 A1    Dec. 13, 2007

(30) Foreign Application Priority Data

Mar. 29, 2006   (AU) ............... 2006901606
May 17, 2006    (AU) ............... 2006902648

(51) Int. Cl.
*A01K 1/01*    (2006.01)
(52) U.S. Cl. ................................. 119/165; 119/166
(58) Field of Classification Search ............. 119/165, 119/166, 479, 458, 433
See application file for complete search history.

(56) References Cited

U.S. PATENT DOCUMENTS

| | | | | |
|---|---|---|---|---|
| 3,890,931 A * | 6/1975 | Saver | ................. | 119/161 |
| 3,990,397 A * | 11/1976 | Lowe, Jr. | ................. | 119/165 |
| 4,444,148 A * | 4/1984 | Lander | ................. | 119/165 |
| 4,627,383 A * | 12/1986 | Metzger | ................. | 119/161 |
| 4,838,204 A * | 6/1989 | Young | ................. | 119/471 |
| 4,869,206 A * | 9/1989 | Spina | ................. | 119/417 |
| 5,148,771 A * | 9/1992 | Schuett et al. | ................. | 119/479 |
| 5,353,743 A * | 10/1994 | Walton | ................. | 119/166 |
| 5,355,837 A * | 10/1994 | Reyes | ................. | 119/161 |
| 6,408,790 B1 * | 6/2002 | Maguire | ................. | 119/166 |
| 6,523,495 B1 * | 2/2003 | Rydman | ................. | 119/167 |
| 6,626,129 B2 * | 9/2003 | Schrader | ................. | 119/479 |
| 6,701,868 B1 * | 3/2004 | Shepherd | ................. | 119/166 |
| 7,107,933 B2 * | 9/2006 | Mohr | ................. | 119/166 |
| 7,395,784 B2 * | 7/2008 | Hirokawa et al. | ................. | 119/165 |

\* cited by examiner

*Primary Examiner*—Yvonne R. Abbott
(74) *Attorney, Agent, or Firm*—Knobbe Martens Olson & Bear LLP (57) ABSTRACT

A portable toilet for an animal, including a catchment part; and a collection part, wherein the catchment part is arranged over the collection part and is shaped to channel urine into the collection part.

12 Claims, 13 Drawing Sheets

PORTABLE TOILET

BACKGROUND OF THE INVENTION

1. Field of the Invention

The present invention relates to a portable toilet for household pets.

2. Description of the Related Art

Household pets may need access a toilet to relieve themselves. This is may be particularly the case where pets reside in apartments that do not include back yards. A variety of pet toilets have been developed to facilitate this purpose. For example, a pet owner may construct a toilet out of a box, or tray, with a lining of sand or other absorbent material. The family pet can be trained to urinate or defecate on the sand of the tray which can be later cleaned up by the pet owner. However, pet toilets of this kind typically need frequent changing may be labor intensive and may not be economical.

Pet toilets of the described kind are typically laid open for use by the pet and, as such, the smell of anything laid to rest in the sand of a tray is free to permeate throughout the household. It may not be convenient to frequently clean the sand and, as such, even the most vigilant pet owner may fall victim to the unpleasant odors emanating from a sullied tray. The litter trays generally need to be kept in dry locations, such as a laundry, and cannot typically be used on balconies, for example.

Another difficulty with the described toilet is that the pet typically needs to stand on the tray with its paws in the sand in order to use the toilet. As such, its paws may become soiled with the results of previous visits to the litter box. It may not be hygienic for animals to track paws sullied by the litter box through a house, for example.

Whilst the described pet toilet may be suitable for cats, for example, pet owners may be less inclined to use such toilets for dogs, who tend to be larger and messier than cats. It may be difficult for dog owners who live in houses without backyards to satisfy their dogs toiletry needs. This may be particularly the case where the dog resides in a high rise apartment.

It is generally desirable to overcome or ameliorate one or more of the above mentioned difficulties, or at least provide a useful alternative.

SUMMARY OF THE INVENTION

In accordance with one aspect of the invention, there is provided a portable toilet for an animal, including a catchment part; and a collection part, wherein the catchment part is arranged over the collection part and is shaped to channel urine into the collection part.

Preferably, the catchment part includes a sloped surface that is shaped to channel urine into the collection part.

Preferably, the catchment part includes a porous synthetic grass surface though which urine can be channeled into the drain.

Preferably, the collection part includes a receptacle shaped to collect urine from the catchment part.

In accordance with another aspect of the invention, there is provided a portable toilet for an animal, including a catchment part; and a collection part, wherein the catchment part is shaped to receive urine from said animal and channel the urine into the collection part.

Preferably, the catchment part includes a sloped surface that is shaped to channel urine into the collection part.

Preferably, the sloped surface includes a plurality of corrugations.

Preferably, troughs defined by said corrugations are adapted to channel urine into the collection part.

BRIEF DESCRIPTION OF THE DRAWINGS

Preferred embodiments of the present invention are hereafter described, by way of non-limiting example only, with reference to the accompanying drawing in which.

DETAILED DESCRIPTION OF PREFERRED EMBODIMENTS OF THE INVENTION

Figure 1:
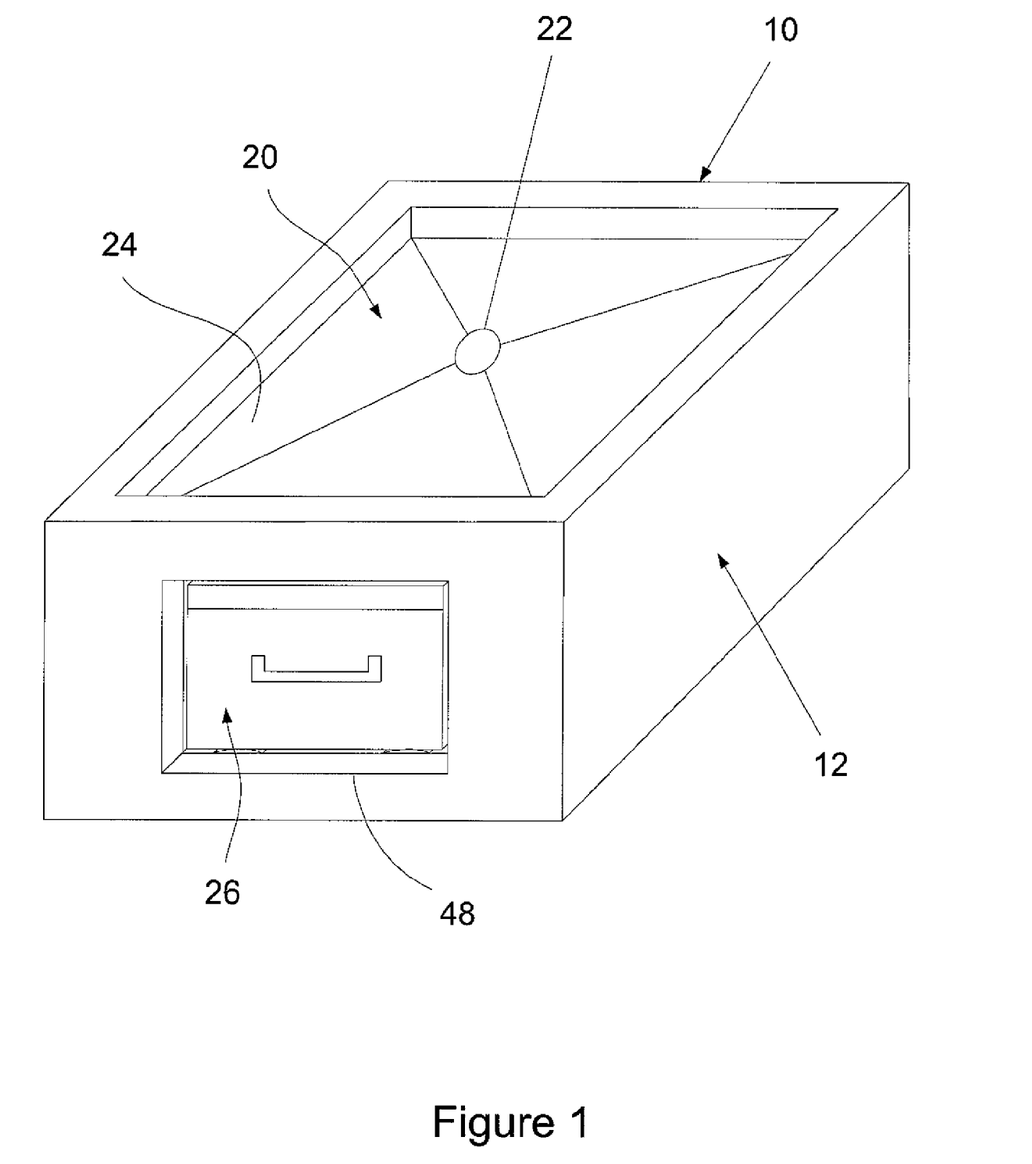
FIG. 1 is a perspective view of a portable toilet.
Figure 2:
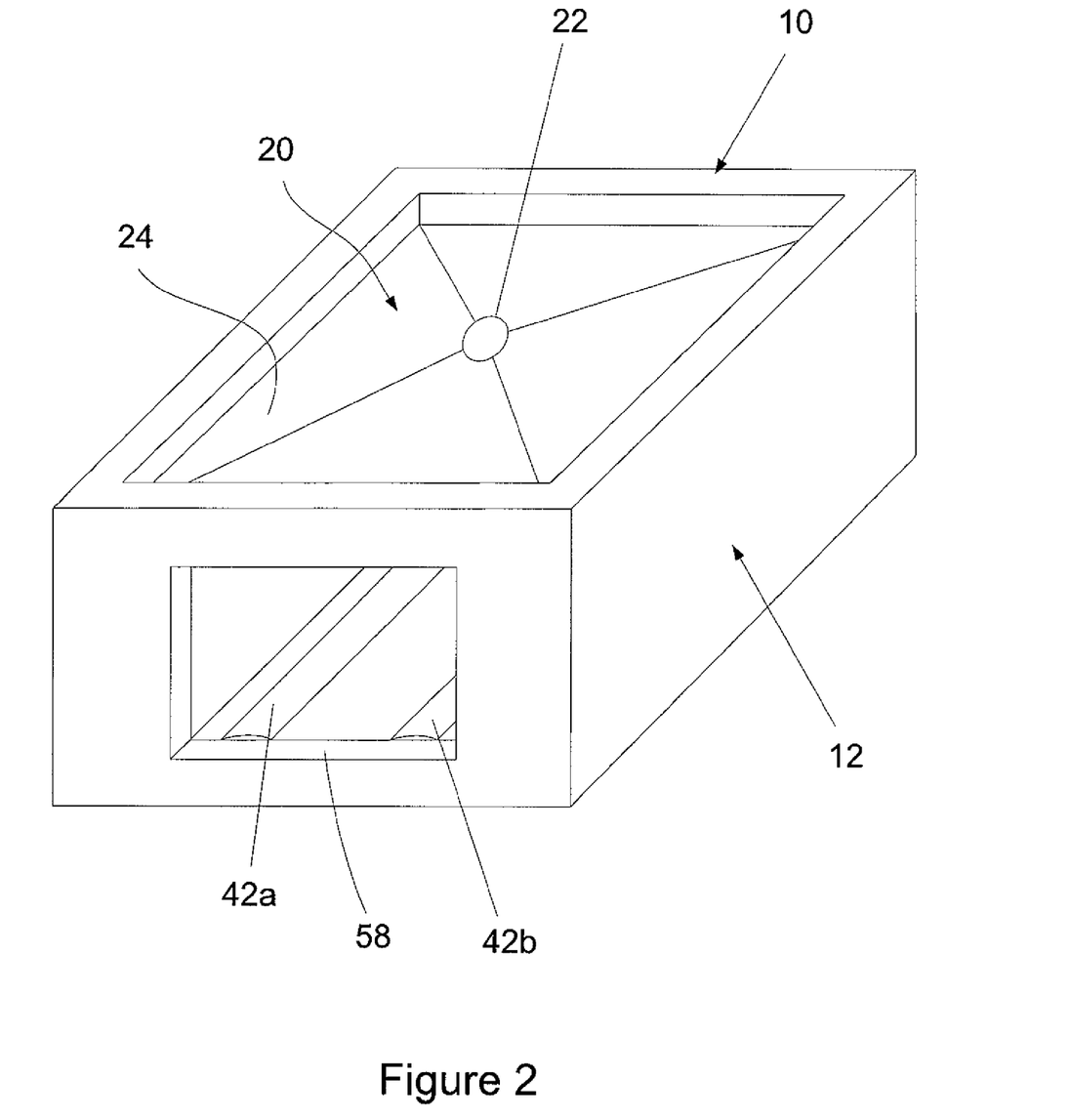
FIG. 2 is a perspective view of a catchment part and a collection part of the portable toilet shown in FIG. 1 arranged in a condition of use.
Figure 3:
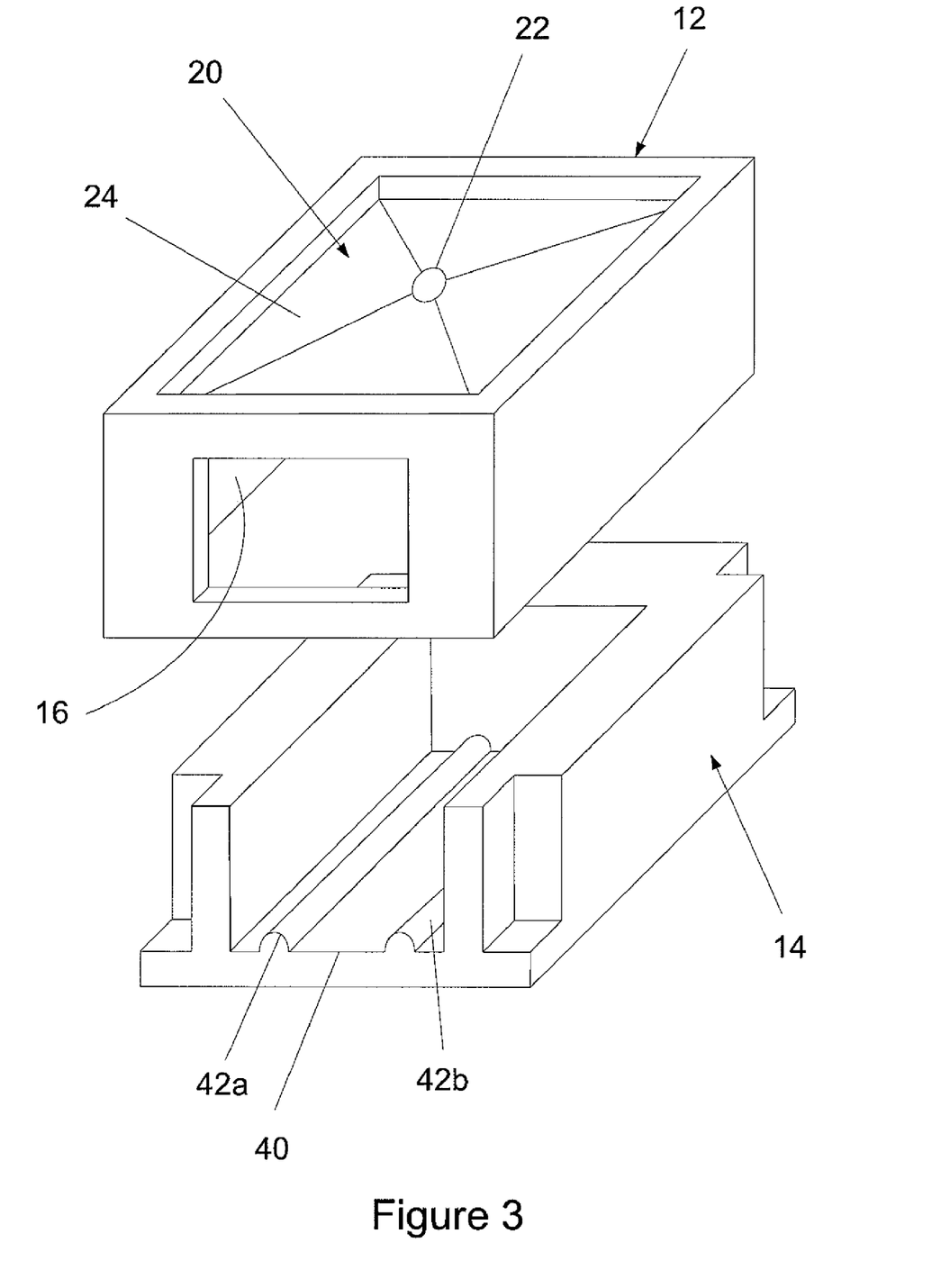
FIG. 3 is an exploded view of the catchment part and the collection part shown in FIG. 2.

The portable toilet 10 shown in FIGS. 1 to 3 is suitable for use with animals such as dogs and cats, for example. The toilet 10 includes a catchment part 12 mounted superiorly over a collection part 14. The catchment part 12 is shaped to support the weight of a dog, for example, and to channel urine into the collection part 14.

The parts 12, 14 are generally rectangular boxes, where the dimensions of the catchment part 12 are slightly larger than those of the collection part 14 so that the part 12 can be located superiorly over the part 14. When so located, the inner sidewalls 16 of the catchment part 12 bear against corresponding outer sidewalls 18 of the collection part 14. The catchment part 12 and the collection part 14 are thereby held together by frictional engagement. The parts 12, 14 could, alternatively, be coupled together using any suitable fasteners, such as screws or adhesives.

Figure 4:
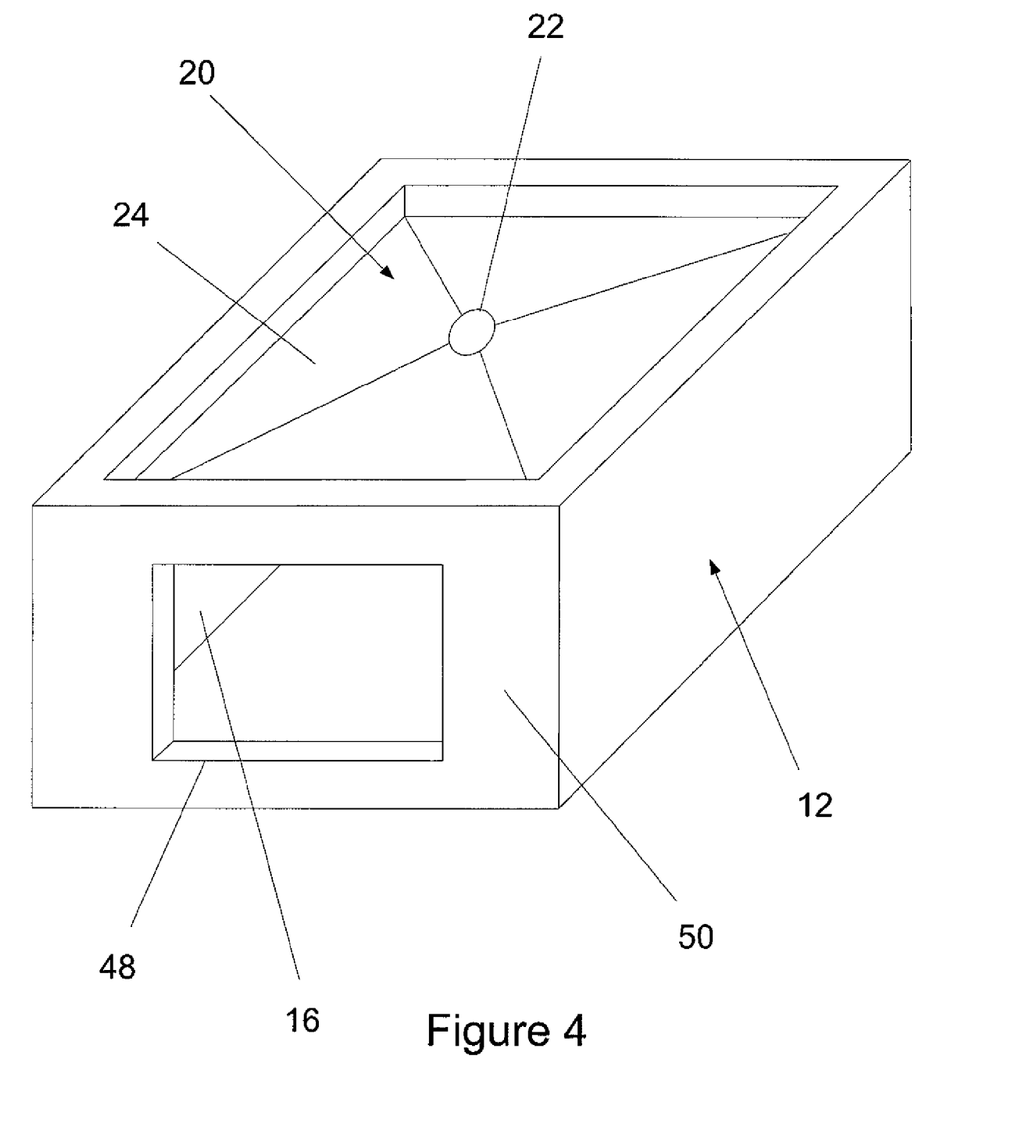
FIG. 4 is a perspective view of the catchment part shown in FIG. 2.

As particularly shown in FIG. 4, the catchment part 12 includes a generally concave surface 20 that is shaped to channel urine into a drain 22 located over the collection part 14. The concave surface 20 includes an outer layer of porous synthetic grass 24 upon which the pet can stand to go to the toilet. The layer of synthetic grass 24 simulates a surface upon which dogs, for example, would be comfortable standing and/or squatting to go to the toilet. The layer of synthetic grass 24 also provides the pet with a surface upon which his or her paws can grip and find traction.

Alternatively, the catchment part 12 includes a sloped surface that is shaped to channel urine into the drain 22 located over the part 14.

The porous quality of the synthetic grass 24 permits urine to be channeled down the concave surface 20 into the collection part 14. Furthermore, the layer of synthetic grass 24 provides a surface upon which the pet can deposit feces for later removal by the pet owner.

Advantageously, the family dog, for example, can be trained to go to the toilet on the synthetic grass 24. Further, the synthetic grass 24 is preferably replaceable.

In an alternative embodiment, the toilet 10 includes a real grass upper surface, or a soil-less grass upper surface, in stead of the synthetic grass 24.

The concave surface 20 preferably has a slope in the range of 3 to 5 degrees to the horizontal.

Figure 5:
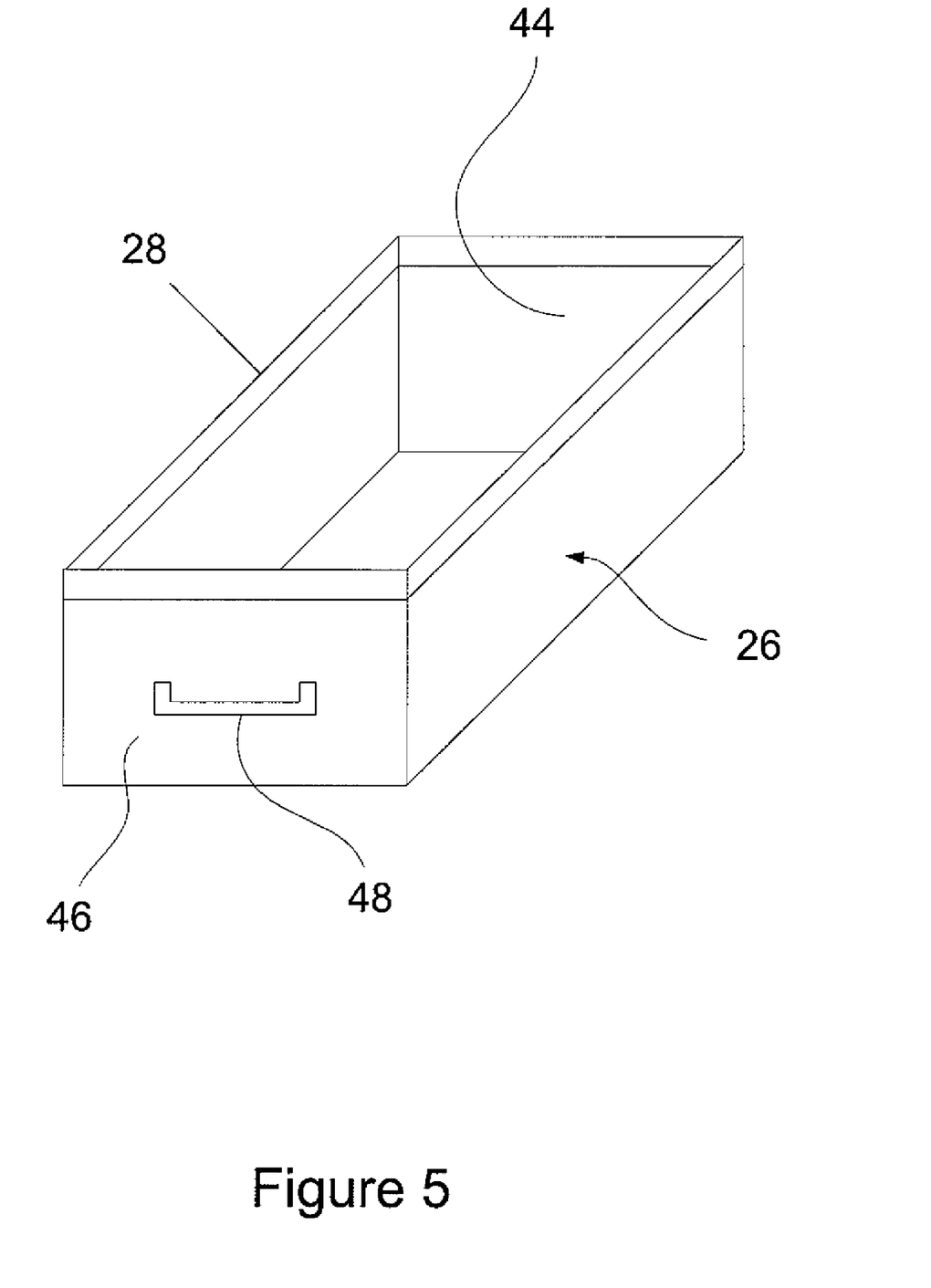
FIG. 5 is a perspective view of a receptacle of the portable toilet shown in FIG. 1.

As mentioned, the collection part 14 is positioned inferiorly to the catchment part 12 so as to collect urine, for example, channeled under the influence of gravity from the catchment part 12. The collection part 14 includes a receptacle 26, as shown in FIG. 5, shaped to collect urine from the catchment part 12. As particularly shown in FIGS. 6 and 7, the receptacle 26 is a generally rectangular draw that that has an open top side 28 and that is shaped to slide along a channel 30 of corresponding dimensions formed in the collection part 14. The channel 30 is defined by two spaced apart parallel walls 32, 34 that extend upwardly from a base section 36 of the collection part 14. The channel 30 is closed at one end 38 and open at another, opposite, end 40. The channel 30 also includes two rails 42a, 42b that run along its direction of extent, between the closed and open ends 38, 40. Upper sections of the rails 42a, 42b engage a bottom surface (not shown) of the draw 26 and assist in its insertion into, and withdrawal from, the channel 30.

Figure 6:
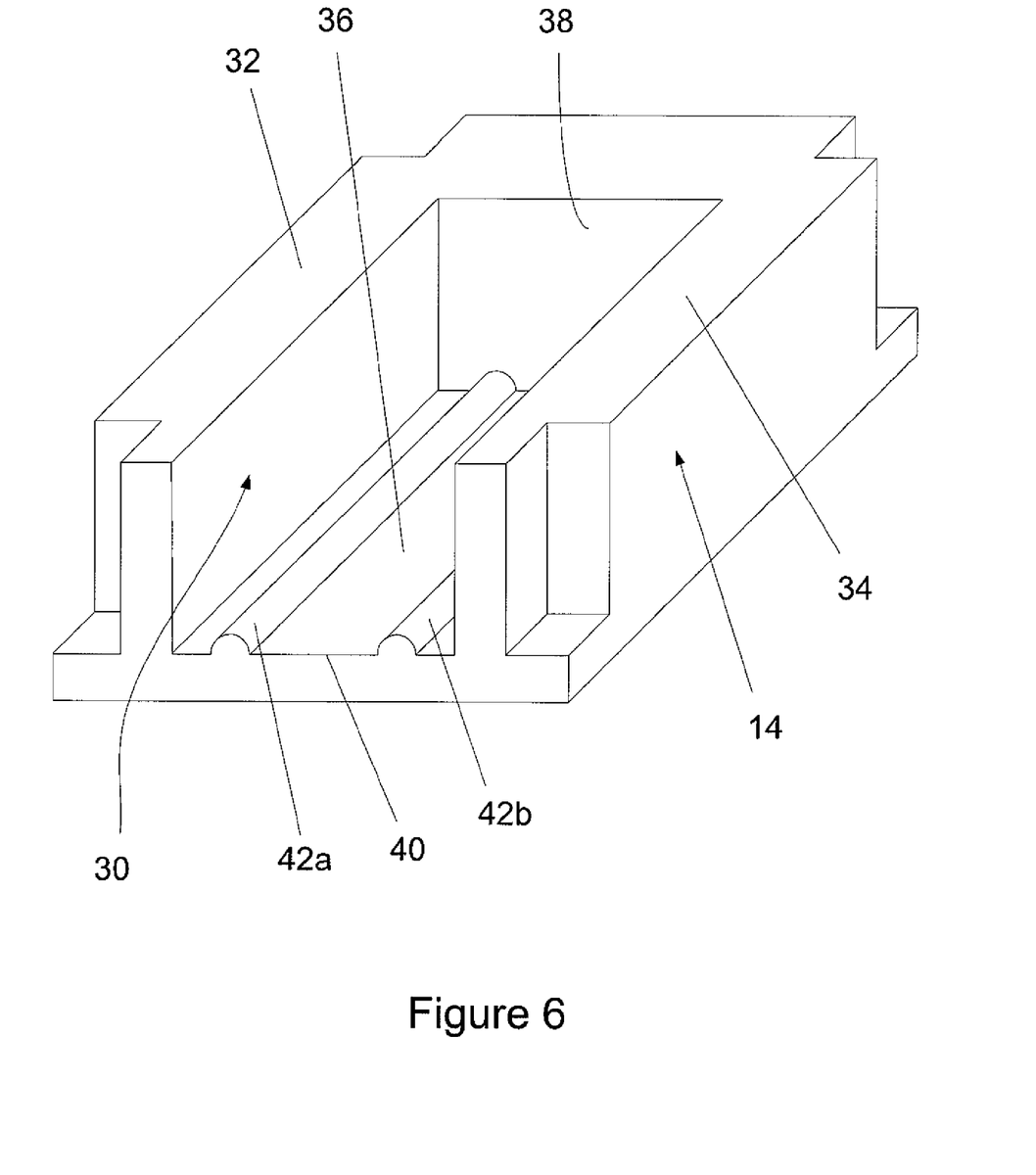
FIG. 6 is a perspective view of the collection part shown in FIG. 2.
Figure 7:
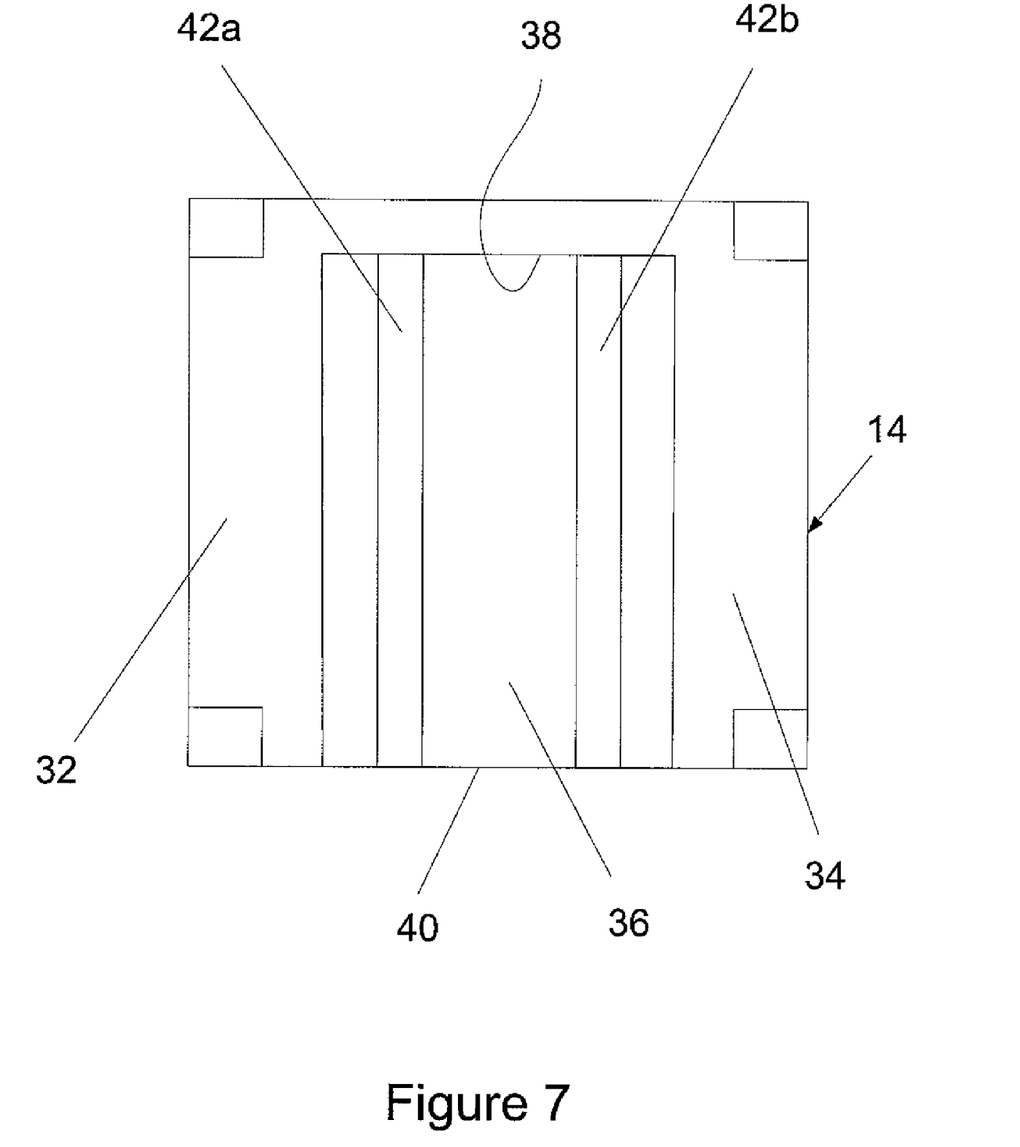
FIG. 7 is a plan view of the collection part shown in FIG. 6.

The draw 26 is located in a position to receive urine from the catchment part 12 when the draw 26 is completely closed, i.e. when a back end 44 of the draw 26 abuts the closed end 38 of the channel 30. When so located, a front end 46 of the draw 26 is adjacent the open end 40 of the channel 30. The draw 26 includes a handle 48 to assist its removal from the channel 30.

The sidewalls 32, 34 inhibit lateral movement of the draw 26 when the draw 26 is arranged in the closed position. Advantageously, the sidewalls 32, 34 prevent the contents of the draw 26 from being spilt due to toilet 10 being knocked laterally.

In use, the toilet 10 can be emptied by performing the following steps:

1. Separating the catchment part 12 from the collection part 14;
2. Sliding the draw 26 out of the channel 30;
3. Emptying the contents of the draw 26 into a normal household toilet, for example;
4. Sliding the draw 26 into the channel 30; and
5. Coupling the catchment part 12 to the collection part 14.

The catchment part 12 preferably includes an access port 48 formed in a front wall 50 located adjacent the open end of the channel 30 when the parts 12, 14 are coupled together in the above described manner. The access port 48 is of a similar size to the front end 46 of the draw 26 so that the draw can be pulled through the port 48. The toilet 10 can thereby be emptied simply by:

1. Sliding the draw 26 out of the channel 30 through the access port 48;
2. Emptying the contents of the draw 26 into a normal household toilet, for example; and
3. Sliding the draw 26 into the channel 30 through the access port 48.

The catchment part 12 preferably includes reinforcement that provides strength to support the weight of a dog standing on the toilet 10. Advantageously, the toilet can support the weight of a 50 kg dog.

The toilet 10 preferably includes a set of wheels that makes moving the toilet around easier.

In an alternative embodiment, the collection part 14 includes means for inferiorly coupling the receptacle 26 to an underside of the catchment part 12 so that urine channeled from the catchment part 12 flows under gravity into the receptacle 26.

In another embodiment, the porous synthetic grass 24 is arranged on a generally planar perforated surface arranged over the concave surface 20. Urine can pass through the synthetic grass 24 and be channeled into the collection part by the concave surface 20.

Figure 8:
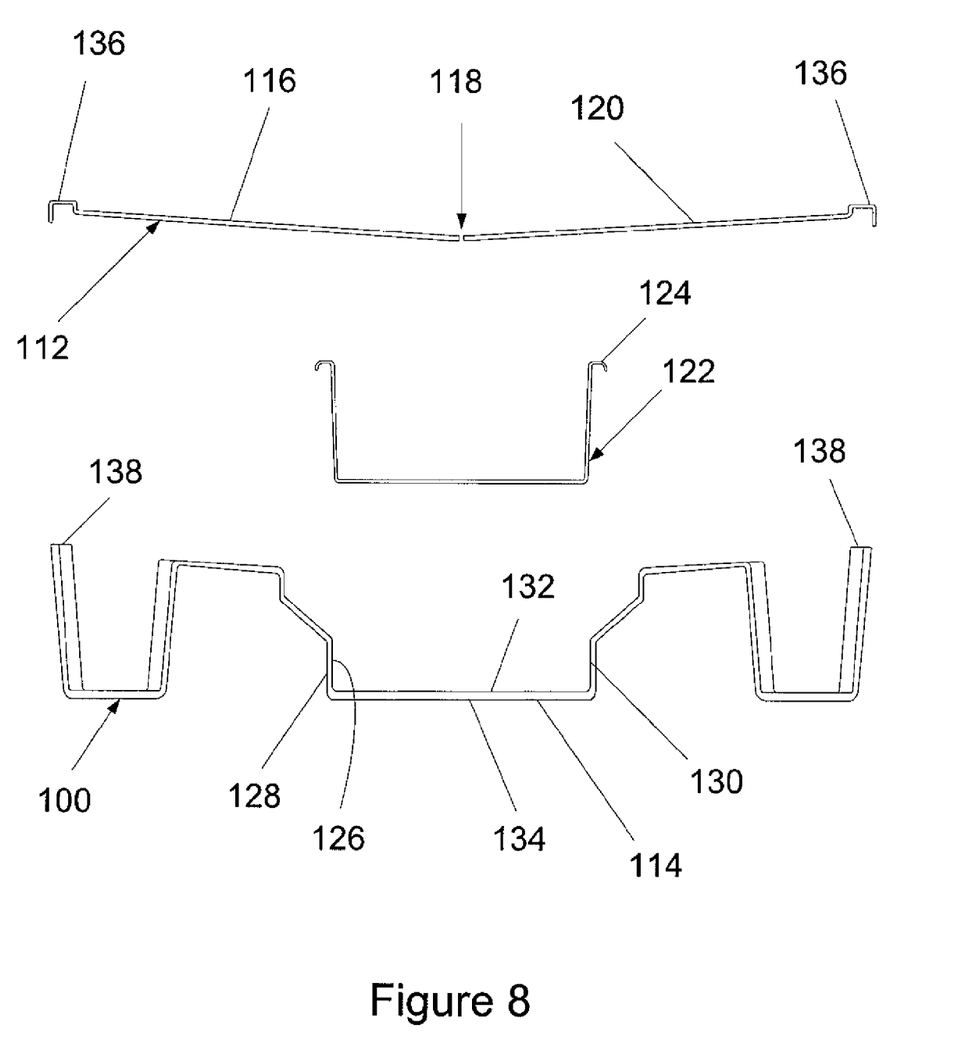
FIG. 8 is an exploded view of another portable toilet.
Figure 9:
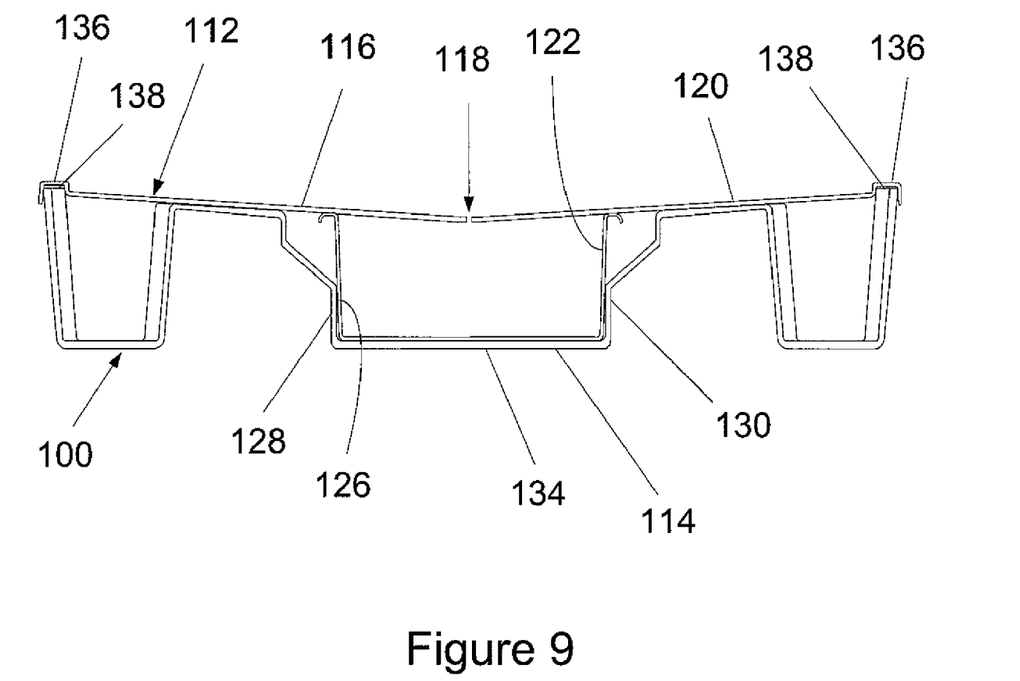
FIG. 9 is another view of the portable toilet shown in FIG. 8.

The portable toilet 100 shown in FIGS. 8 and 9 is suitable for use with animals such as dogs and cats, for example. The toilet 100 includes a catchment part 112 mounted superiorly over a collection part 114. The catchment part 112 is shaped to support the weight of a dog, for example, and to channel urine into the collection part 114.

The part 112 includes a generally planar concave surface 116 that is shaped to channel urine into a drain 118 located over the collection part 114. The concave surface 116 includes an outer layer of porous synthetic grass 120 upon which the pet can stand to go to the toilet. The layer of synthetic grass 120 simulates a surface upon which dogs, for example, would be comfortable standing and squatting to go to the toilet. The layer of synthetic grass 120 also provides the pet with a surface upon which his or her paws can grip and find traction.

As above described, the porous quality of the synthetic grass 120 permits urine to be channeled down the concave surface 116 into the collection part 114. Furthermore, the layer of synthetic grass 120 provides a surface upon which the pet can deposit feces for later removal by the pet owner.

The concave surface 116 preferably has a slope in the range of 3 to 5 degrees from the horizontal.

The collection part 114 is positioned inferiorly to the catchment part 112 so as to collect urine, for example, channeled under the influence of gravity. The collection part 114 includes a receptacle 122 shaped to collect urine from the catchment part 112. The receptacle 122 is preferably a generally rectangular draw that that has an open top side 124 and that is shaped to slide along a channel 126 of corresponding dimensions formed in the collection part 114. The channel 126 is defined by two spaced apart parallel walls 128, 130 extending upwardly from a base section 132 of the collection part 114. The channel 126 is closed at one end (not shown) and open at another, opposite, end 134.

The receptacle 122 is located in a position to receive urine from the catchment part 112 when it is completely closed, i.e. when a back end of the receptacle 122 abuts the closed end of the channel 126. The sidewalls 128, 130 inhibit lateral movement of the draw 122 when closed. Advantageously, the sidewalls 128, 130 prevent the contents of the draw 122 from being spilt due to toilet being knocked laterally.

The catchment part 12 is preferably coupled to the collection part 114 by way of an over locking rim 136 that extends around the periphery of the catchment part 112. As particularly shown in FIG. 9, the over locking rim 136 is shaped to receive and resiliently expand over corresponding upper sections 138 of the collection part 114. The catchment part 112 is thereby held in resilient engagement with the collection part 114. Alternatively, the parts 112, 114 can be coupled together using any suitable fastener The portable toilet 200 shown in FIGS. 10 to 14 is suitable for use with animals such as dogs and cats, for example. The toilet 200 includes a catchment part 212 mounted superiorly over a collection part 214. The catchment part 212 is shaped to support the weight of a dog, for example, and to channel urine into the collection part 214.

Figure 10:
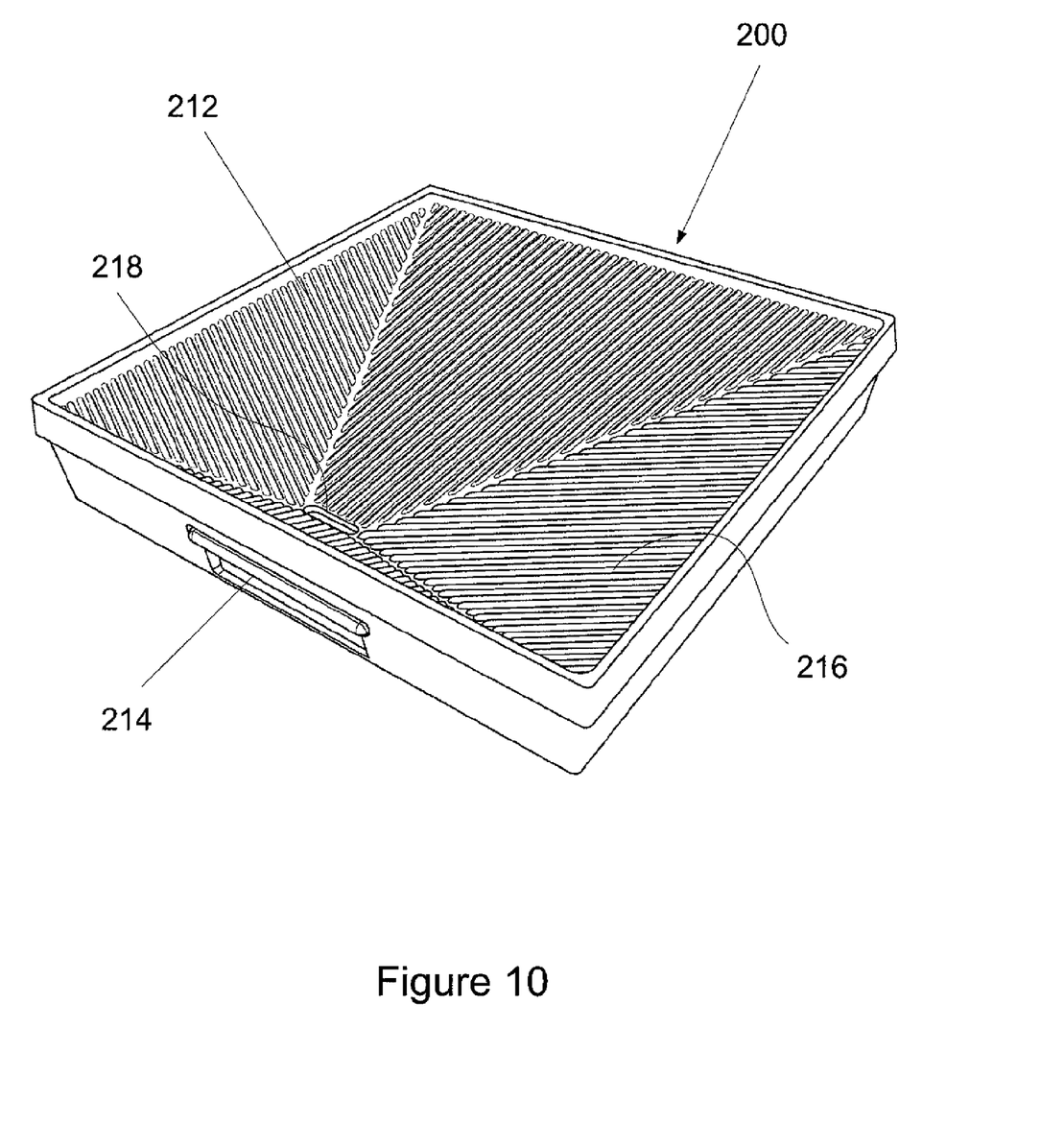
FIG. 10 is a perspective view of yet another portable toilet.
Figure 11:
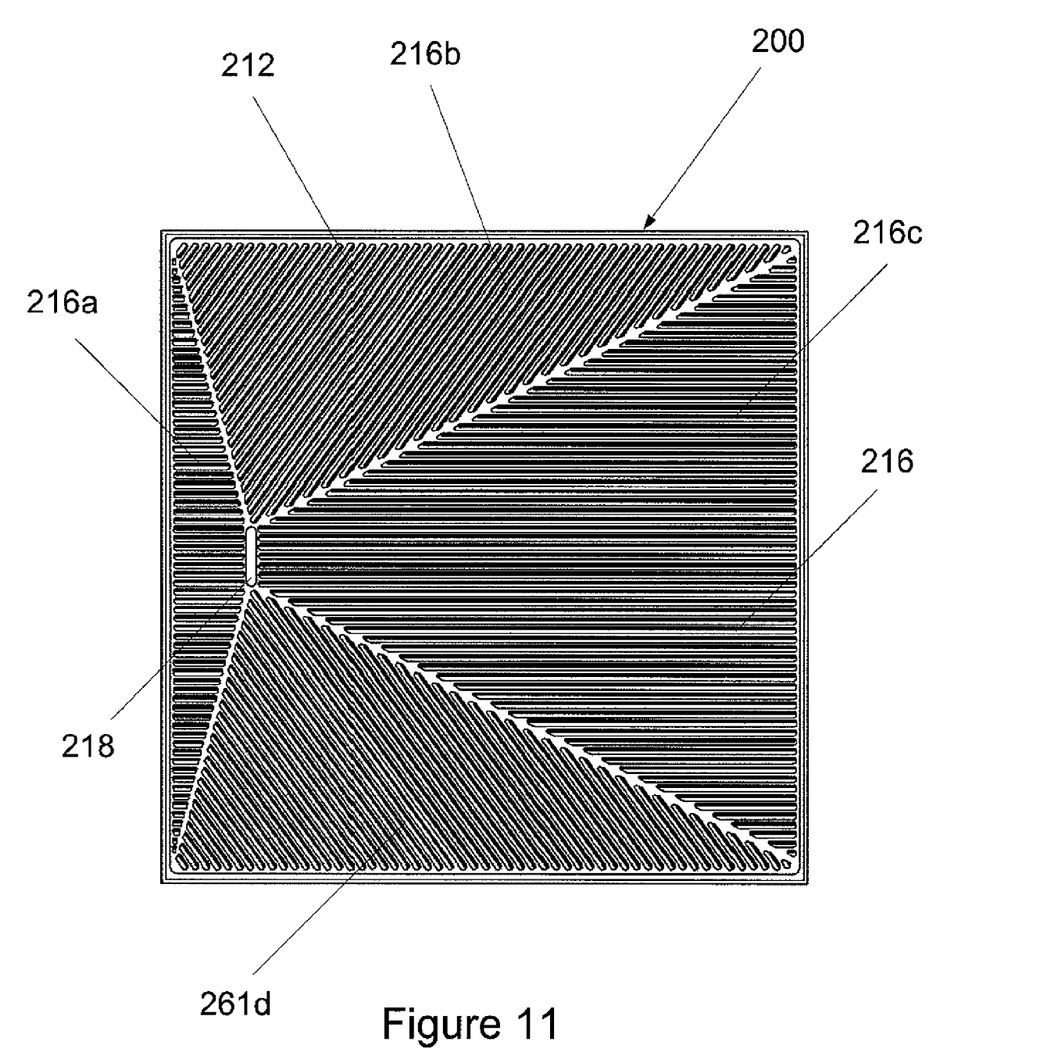
FIG. 11 is a plan view of the portable toilet shown in FIG. 10.
Figure 12:
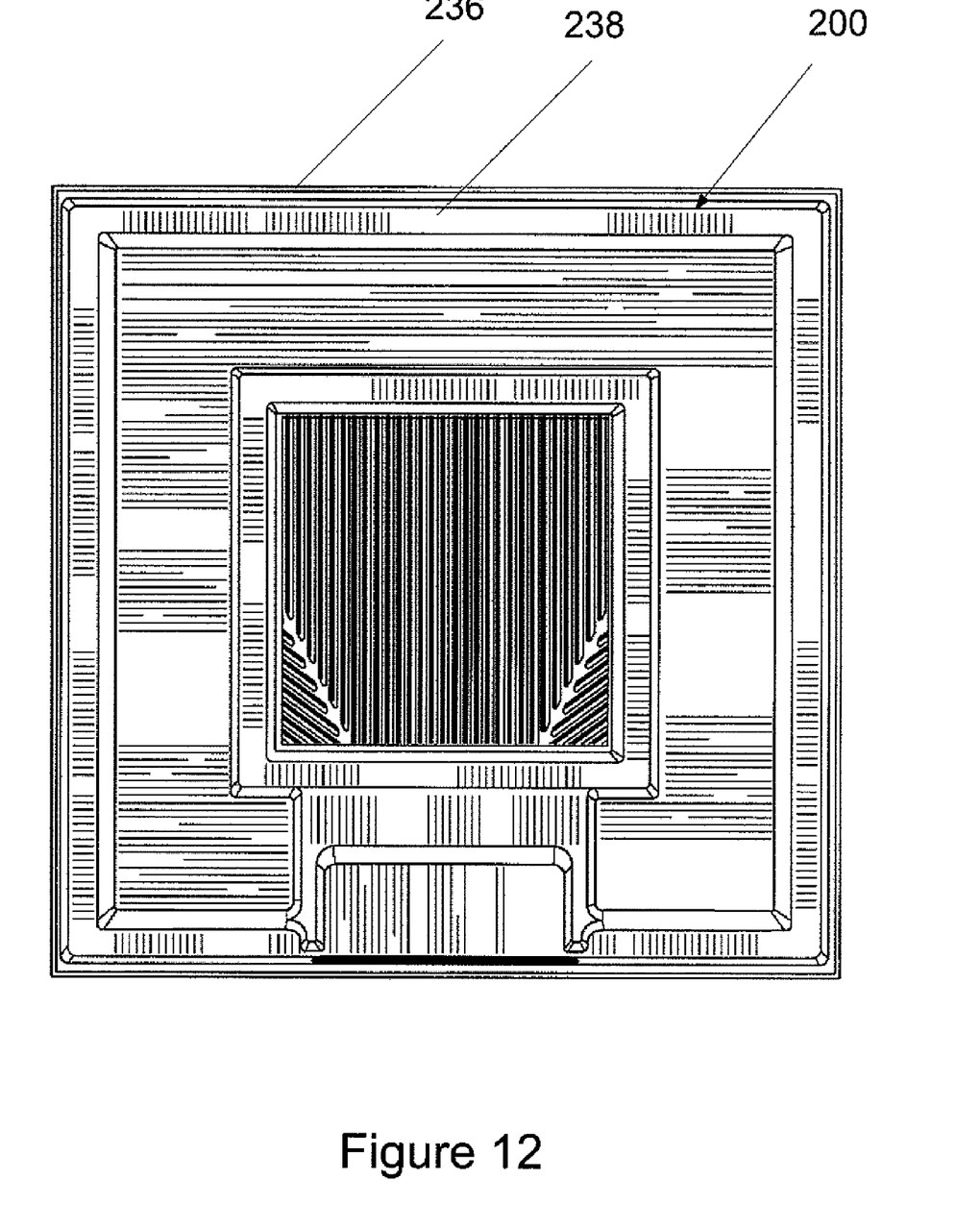
FIG. 12 is a bottom view of the portable toilet shown in FIG. 10.
Figure 13:
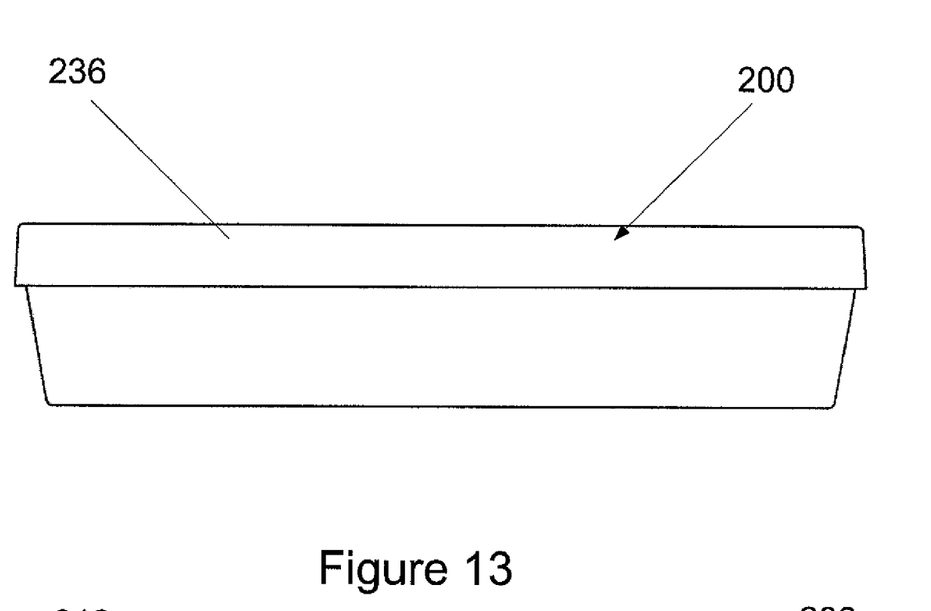
FIG. 13 is a front view of the portable toilet shown in FIG. 10.

The part 212 includes a sloped surface 216 that is shaped to channel urine into a drain 218 located over the collection part 214. The sloped surface 216 includes four corrugated sections 216a, 216b, 216c, 216d arranged to channel urine into the drain 218. In particular, troughs of the corrugations define a plurality of channels that are shaped to direct urine received from thereabove, down the sloped surface 216 towards the drain 218.

The part 212 also includes an upper layer of porous synthetic grass (not shown) that is shaped to cover the sloped surface 216. The synthetic grass provides a surface upon which the pet can stand to go to the toilet. The layer of synthetic grass simulates a surface upon which dogs, for example, would be comfortable standing and/or squatting to go to the toilet. The layer of synthetic grass also provides the pet with a surface upon which his or her paws can grip and find traction.

As above-described, the porous quality of the synthetic grass permits urine to pass through the synthetic surface down to the sloped surface 216. The corrugations of the sloped surface 216 thereafter channel the urine into the drain 218. The synthetic grass rests on the peaks of the corrugations of the sloped surface 216 and is thereby supported in an elevated arrangement over the troughs of the corrugations. Advantageously, the synthetic grass does not inhibit the flow of urine through the channels of the sloped surface 216 as the urine flows towards the drain 218. Further, since the synthetic grass rests on the peaks of the corrugations, it does not sit in the path of the urine as it flows towards the drain 218. As such, the synthetic grass can properly drain urine and remains drier than it would if it sat flush with the sloped surface 216.

The sloped surface 216 preferably has a slope in the range of 3 to 5 degrees from the horizontal.

The collection part 214 is positioned inferiorly to the catchment part 212 so as to collect urine, for example, channeled to the drain 218 under the influence of gravity. The collection part 214 includes a receptacle 222 shaped to collect urine from the catchment part 212. As particularly shown in FIG. 14, the receptacle 222 is preferably a generally rectangular draw that that has an open top side and that is shaped to slide along a channel 226 of corresponding dimensions formed in the collection part 214. The channel 226 is defined by two spaced apart parallel walls extending upwardly from a base section of the collection part 214. The channel 226 is closed at one end and open at another, opposite, end.

Figure 14:
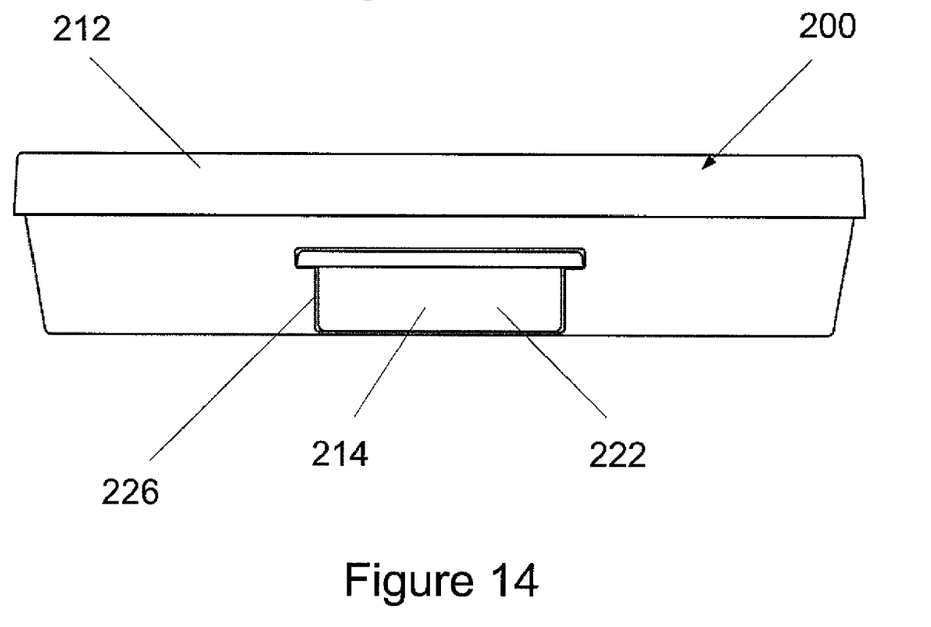
FIG. 14 is a back view of the portable toilet shown in FIG. 10.

The receptacle 222 is located in a position to receive urine from the catchment part 212 when it is completely closed, i.e. when a back end of the receptacle 222 abuts the closed end of the channel 226. The sidewalls inhibit lateral movement of the draw 222 when closed. Advantageously, the sidewalls prevent the contents of the draw 122 from being spilt due to toilet being knocked laterally.

The catchment part 212 is preferably coupled to the collection part 214 by way of an over locking rim 236 that extends around the periphery of the catchment part 212. As particularly shown in FIG. 12, the over locking rim 236 is shaped to receive and resiliently expand over corresponding upper sections 238 of the collection part 214. The catchment part 212 is thereby held in resilient engagement with the collection part 214. Alternatively, the parts 212, 214 can be coupled together using any suitable fastener Advantageously, the toilet 10, 100, 200 can be used interiorly or exteriorly.

Advantageously, the toilet 10, 100, 200 can be disinfected and/or deodorized. In particular, the concave surface, including the synthetic grass, can be disinfected and/or deodorized.

While we have shown and described specific embodiments of the present invention, further modifications and improvements will occur to those skilled in the art. We desire it to be understood, therefore, that this invention is not limited to the particular forms shown and we intend in the append claims to cover all modifications that do not depart from the spirit and scope of this invention.

Throughout this specification, unless the context requires otherwise, the word "comprise", and variations such as "comprises" and "comprising", will be understood to imply the inclusion of a stated integer or step or group of integers or steps but not the exclusion of any other integer or step or group of integers or steps.

The reference to any prior art in this specification is not, and should not be taken as, an acknowledgment or any form of suggestion that the prior art forms part of the common general knowledge in Australia.

What is claimed is:

1. A portable toilet for an animal, including:
    a catchment part comprising a sloped surface shaped to channel urine towards a drain, wherein the sloped surface includes a plurality of corrugations;
    a collection part arranged under said drain for receiving urine from the catchment part; and
    a porous synthetic grass surface shaped to overlie peaks of the corrugations of the catchment part,
    wherein the grass surface is adapted to pass urine therethrough into troughs of said corrugations for drainage into the collection part.

2. A portable toilet as claimed in claim 1, wherein the sloped surface is generally concave having a slope in the range of 3 to 5 degrees from the horizontal.

3. A portable toilet as claimed in claim 2, wherein the collection pan includes a receptacle shaped to collect urine from the catchment part, wherein the receptacle is removable from the toilet so that it can be emptied.

4. A portable toilet as claimed in claim 3, wherein the receptacle includes a handle to assist its removal.

5. A portable toilet as claimed in claim 3, wherein the collection part includes a channel shaped to locate the receptacle in a predetermined position for collection of urine from the catchment part.

6. A portable toiled as claimed in claim 5, wherein the channel is open at one end so that the receptacle can be removed from the toilet.

7. A portable toilet as claimed in claim 1, wherein the collection part includes a receptacle shaped to collect urine from the catchment part.

8. A portable toilet as claimed in claim 7, wherein the receptacle is removable from the toilet so that it can be emptied.

9. A portable toilet as claimed in claim 7, wherein the collection part includes a channel shaped to locate the receptacle in a predetermined position for collection of urine from the catchment part.

10. A portable toilet as claimed in claim 9, wherein the channel is open at one end so that the receptacle can be removed from the toilet.

11. A portable toilet as claimed in claim 7, wherein the receptacle includes a handle to assist its removal.

12. A portable toilet for an animal, including a catchment part comprising a sloped surface that is shaped to channel urine into the collection part, wherein the sloped surface includes a plurality of corrugations; and a collection part, wherein the catchment part is shaped to receive urine from said animal and channel the urine into the collection part, and wherein the catchment area includes a synthetic grass surface shaped to overlie peaks of the corrugations of the catchment pad.

* * * * *

UNITED STATES PATENT AND TRADEMARK OFFICE
CERTIFICATE OF CORRECTION

PATENT NO. : 7,584,717 B2　　　　　　　　　　　　　　　　　　　　　　　　　　　Page 1 of 1
APPLICATION NO. : 11/692812
DATED : September 8, 2009
INVENTOR(S) : Skovron et al.

It is certified that error appears in the above-identified patent and that said Letters Patent is hereby corrected as shown below:

Title page under Assignee which reads "Pup Pee Silutions Pty Ltd", should read -- Pup Pee Solutions Pty Ltd --.

Column 6, line 50, which reads "pan" should read -- part --.

Column 8, line 7, which reads "pad" should read -- part --.

Signed and Sealed this

Eighteenth Day of May, 2010

David J. Kappos
*Director of the United States Patent and Trademark Office*